F. A. G. PAPE.
NUT CRACKING MACHINE.
APPLICATION FILED NOV. 22, 1919.

1,342,692.

Patented June 8, 1920.
2 SHEETS—SHEET 1.

Frederic G. G. Pape Inventor
By his Attorneys
Pennie Davis Marvin & Edmonds

F. A. G. PAPE.
NUT CRACKING MACHINE.
APPLICATION FILED NOV. 22, 1919.

1,342,692.

Patented June 8, 1920.
2 SHEETS—SHEET 2.

Frederic A. G. Pape Inventor
By his Attorneys
Pennie Davis Marvin & Edmonds

UNITED STATES PATENT OFFICE.

FREDERIC A. G. PAPE, OF NEW YORK, N. Y., ASSIGNOR TO LYMAN N. HINE, OF NEW YORK, N. Y.

NUT-CRACKING MACHINE.

1,342,692.      Specification of Letters Patent.      Patented June 8, 1920.

Application filed November 22, 1919. Serial No. 339,879.

*To all whom it may concern:*

Be it known that I, FREDERIC A. G. PAPE, a citizen of Germany, residing at New York, in the county of New York, State of New York, have invented certain new and useful Improvements in Nut-Cracking Machines; and I do hereby declare the following to be a full, clear, and exact description of the invention, such as will enable others skilled in the art to which it appertains to make and use the same.

This invention relates to an improved machine for cracking palm nuts and the like, and more particularly for cracking cohune nuts having a thick, hard, stone-like shell. The present invention provides an improved cracking machine for cracking nuts in a rapid and continuous manner with a minimum of injury to the nut kernels containing valuable oil.

The nut cracking machine of the present invention is in some respects similar to the nut cracking machine of my companion application Serial No. 339,878, filed Nov. 22, 1919, in that it provides for gripping the nuts laterally and forcing them between cracking disks or surfaces having an opening therebetween of gradually decreasing size so that the nuts are subjected to endwise compression to effect crushing and breaking thereof. The palm nuts, before subjecting them to the cracking operation, are preferably first subjected to a depericarping or husking operation to remove the outer shell or husk so that the nuts will be made available in a clean state for the cracking operation. A suitable method and apparatus for effecting this depericarping operation is described in my companion application Serial No. 304,025. In my said companion application Serial No. 330,878, I have described an improved method and apparatus for cracking palm nuts and the like according to which the nuts are gripped laterally and, while so gripped, are forced into the tapered space between crushing disks where the nuts are subjected to endwise compression with resulting cracking or breaking. The specific machine of said companion application provides a nut-gripping link-chain for gripping the nuts and holding them while they are being cracked. In the machine of the present invention such a nut-gripping link-chain is eliminated and there is used instead a built-up nut conveying and nut-gripping wheel for receiving the nuts and holding them while they are being cracked.

The invention will be further described in connection with the accompanying drawings illustrative thereof in which—

Figure 1:
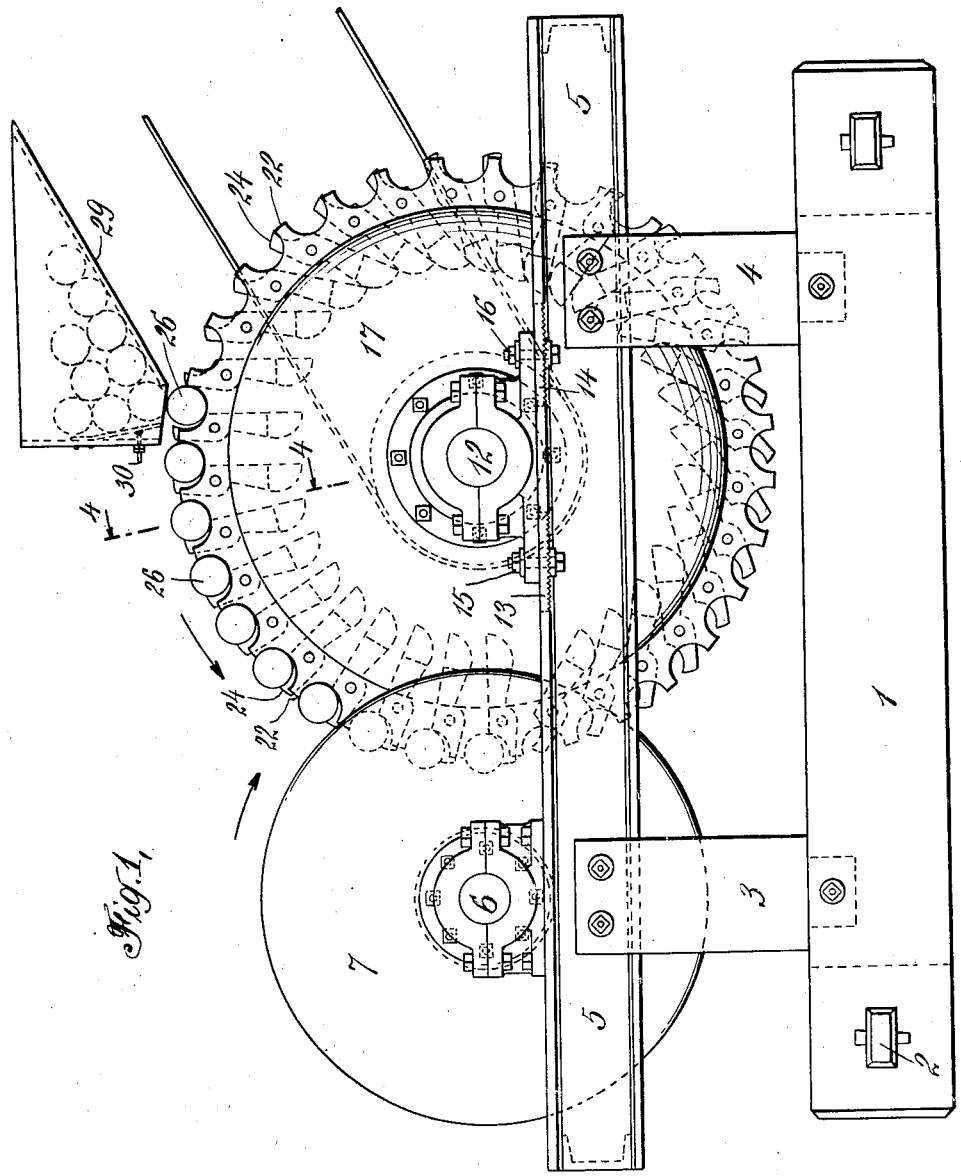
Figure 1 shows in a somewhat diagramatic and conventional manner a side elevation of the nut-cracking machine.
Figure 2:
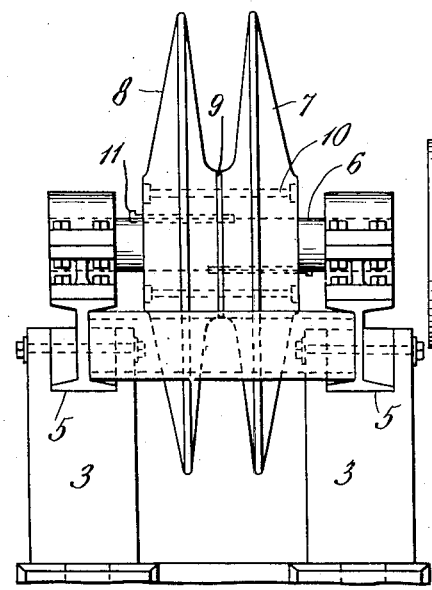
Fig. 2 is a left-hand end view of part of the machine.
Figure 3:
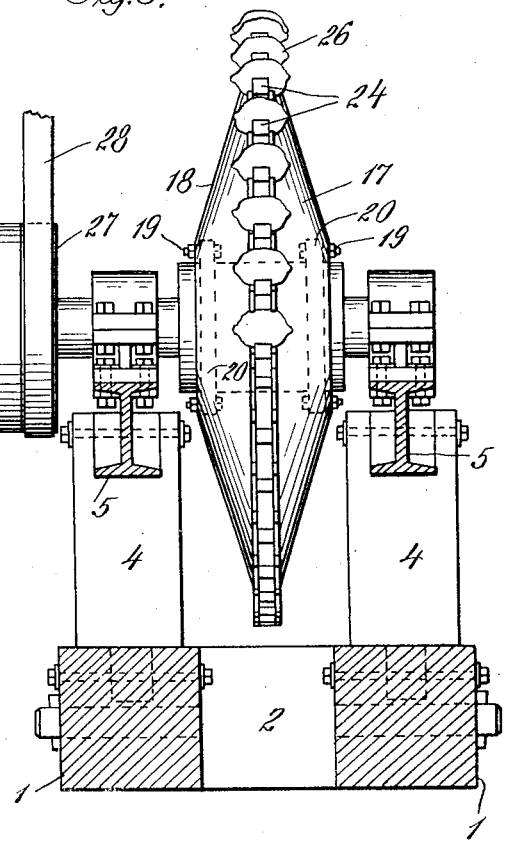
Fig. 3 is a right-hand end view of part of the machine.
Figure 4:
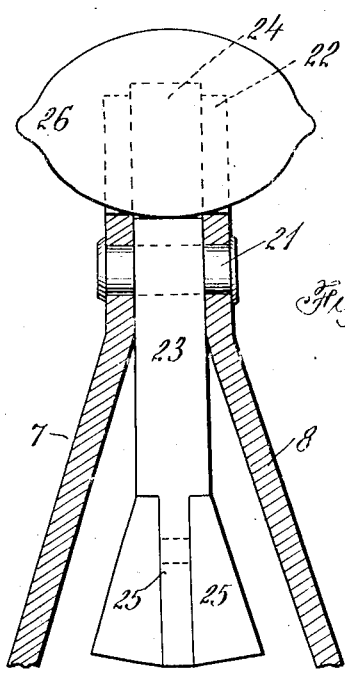
Fig. 4 is an enlarged view taken on the line 4—4 of Fig. 1.

The machine is supported by a suitable framework made up of the lower longitudinal members 1 and transverse members 2 of wood or other suitable material. These members carry the upright members 3 and 4 which in turn support the upper frame members 5 upon which are mounted the bearings of the shafts 6 and 12.

The shaft 6 carries thereon two crushing disks 7 and 8 having their inner surfaces beveled or tapered as shown and either smooth or radially corrugated. These crushing disks are spaced apart a greater or lesser distance by means of one or more washers 9 so that the space therebetween can be increased or decreased. The disks are bolted together by bolts 10 and secured to the shaft by suitable securing means such as keys 11.

The shaft 12 is adjustably mounted upon the frame members 5, the bolts 15 and 16 being adjustable in slots 13 and 14 and the bottom surfaces of the slotted flanges of the members 5 being roughened or corrugated so that they may be effectively gripped by the gripping members carried by the bolts 15 and 16. By loosening these bolts the bearings and the shaft 12 and the member carried thereby can be moved toward or away from the cracking disks 7 and 8.

Mounted upon the shaft 12 is a built-up nut-gripping wheel. As illustrated, this wheel is made up of a hub member carried by the shaft and having flanges 20 to which two concave dish-shaped metal disks 17 and 18 are secured by means of bolts 19. These metal disks may be conveniently made up of pressed steel or other suitable material. At their outer circumferences they are spaced apart a suitable distance and have bolts or rivets 21 upon which are pivoted the weighted levers or tumblers 23. The outer edges of the disks 7 and 8 have recesses cut therein of a shape such that one portion thereof will conform generally with the shape of the nut. The weighted levers or tumblers 23 have their outer end similarly curved to act as nut-gripping surfaces while upon their inner ends they have weights 25. These tumblers are pivotally mounted so that they will hang loose upon the pins 21 so as to swing freely as the wheel revolves. That is, these tumblers or weighted levers will hang vertically when at the top of the wheel and the weighted ends of the levers will tend to remain in a downward position while the wheel is being revolved. The form of the recesses in the peripheries of the disks and of the curved outer portion of the weighted levers, and the arrangement of these weighted levers, is such that the recesses can receive the nuts to be cracked and hold these nuts while they are being conveyed between the cracking disks.

A hopper 29, constantly agitated by an oscillatory agitating device 30 is arranged above the disk wheel and has an oval opening directly over the center of the wheel so that the nuts will drop automatically into the openings at the periphery of the wheel and will be arranged in a transverse position in such openings. The wheel is continuously revolved in a counter clockwise direction and the nuts are gripped by the outer curved portion 24 of the tumblers 23, this gripping action increasing as the wheel turns, owing to the increasing effect of the weighted portions 25 of these tumblers. These tumblers are therefore caused to jam against the under surface of the nut and the nuts are thus held firmly and conveyed into the space between the disks 7 and 8 where they are subjected to gradually increasing endwise pressure until the cracking takes place. While the nuts are firmly gripped in the manner above described, this gripping action is nevertheless such that the grip can be loosened and slight rearrangement of the nut permitted by uneven pressure on the nut as it is passing between the crushing disks.

It will be seen that the nuts are received upon the periphery of the wheel and are there gripped and held, and that the periphery of this wheel together with the nuts carried thereby passes between the beveled or tapered portions of the crushing disks so that the nuts are subjected to a progressively increasing endwise crushing action between such disks, the nuts being broken as they move forward and downward upon the circumference of the built-up wheel and in between the steadily decreasing space between the nut crushing disks. The crushing action is therefore similar to that which takes place with the machine of my said companion application Serial No. 339,878. After the crushing takes place, the broken pieces of shell and the kernels are permitted to drop down and are collected and the kernels separated from the crushed shells.

It is advantageous to subject the nuts coming to the cracking machine to a preliminary sizing operation so that nuts of substantially the same size will be acted upon until nuts of that particular size have been used up. If then, a smaller size or a larger size of nuts are to be cracked, the apparatus can be adjusted for that particular size. This adjustment can be effected by increasing the space between the crushing disks, as by the insertion or removal of one or more washers 9, or by using disks of different sizes or construction. Adjustment can also be effected by moving the nut carrying wheel toward or away from the crushing disks, this adjustment being effected by moving the bearings of the shaft 12 upon the supporting frame.

The apparatus of the present invention is of simple and rugged construction and can be operated without requiring the attention of an expert. It is also continuous and automatic in operation and can be driven from any suitable source of power, for example, by means of a belt 28 acting upon a pulley 27 carried by the shaft 6. The apparatus can be readily transported from one place to another and it can be mounted upon a truck or car for transportation or for use.

It will be evident that variations and modifications can be made in the specific construction of the apparatus illustrated and described without departing from the spirit and scope of the invention.

I claim:

1. A nut cracking machine for cracking palm nuts and the like, comprising nut crushing disks or surfaces having an opening therebetween of progressively decreasing width and a nut carrying wheel adapted to grip and hold the nuts and to convey them into such space, whereby they are subjected to progressively increasing pressure and thereby cracked.

2. A nut cracking machine for cracking palm nuts and the like, comprising nut cracking disks or surfaces having an opening therebetween of progressively decreasing width, a nut carrying wheel having at its periphery nut gripping recesses, said wheel being arranged so that its periphery will rotate in said space and thereby carry the nuts into said space to be cracked.

3. In a nut cracking machine having disks or surfaces with a space therebetween of gradually decreasing size, a nut carrying wheel for carrying the nuts into said space for cracking them, said nut carrying wheel having recesses in its outer periphery and nut gripping tumblers arranged to grip the nuts and hold them in said recesses while they are being cracked.

4. A nut cracking machine for cracking palm nuts and the like, comprising crushing disks or surfaces having a space therebetween of gradually decreasing width and a nut carrying wheel adapted to receive the nuts and convey them into said space for cracking them, said nut carrying wheel having disk members spaced apart at their outer edges and joined by pivots upon which are mounted nut gripping tumblers, the shape of the tumblers and the shape of the outer edges of such disks being such as to permit the reception and gripping of nuts to be cracked.

5. A nut cracking machine for cracking palm nuts and the like, comprising nut crushing disks or surfaces having an opening therebetween of progressively decreasing width, and a nut carrying wheel adapted to hold the nuts and convey them into said opening, whereby they are subjected to progressively increasing pressure and thereby cracked, and means for varying the distance of said wheel from said cracking surfaces.

6. In a nut cracking machine, a nut crushing device, a nut holding device adapted to bring nuts into forcible engagement with the nut crushing device, said nut holding device being provided with an adjustable, gravity actuated nut gripping element.

In testimony whereof I affix my signature.

FREDERIC A. G. PAPE.